US011399458B2

(12) United States Patent
Kemmerer et al.

(10) Patent No.: US 11,399,458 B2
(45) Date of Patent: Aug. 2, 2022

(54) AGRICULTURAL HEADER WITH DEBRIS REMOVAL SYSTEM

(71) Applicant: CNH Industrial America LLC, New Holland, PA (US)

(72) Inventors: Benjamin D. Kemmerer, Hamburg, PA (US); Blaine R. Noll, Fleetwood, PA (US); Scott P. Deichmann, Phoenixville, PA (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 17/421,525

(22) PCT Filed: Jan. 9, 2020

(86) PCT No.: PCT/US2020/012893
§ 371 (c)(1),
(2) Date: Jul. 8, 2021

(87) PCT Pub. No.: WO2020/146604
PCT Pub. Date: Jul. 16, 2020

(65) Prior Publication Data
US 2022/0039314 A1 Feb. 10, 2022

Related U.S. Application Data
(60) Provisional application No. 62/790,164, filed on Jan. 9, 2019.

(51) Int. Cl.
A01D 34/14 (2006.01)
A01D 61/00 (2006.01)
(Continued)

(52) U.S. Cl.
CPC ............. A01D 34/40 (2013.01); A01D 34/04 (2013.01); A01D 34/14 (2013.01); A01D 57/20 (2013.01); A01D 61/002 (2013.01); A01D 41/14 (2013.01)

(58) Field of Classification Search
CPC ........ A01D 34/04; A01D 34/14; A01D 34/16; A01D 34/17; A01D 34/18; A01D 34/20; (Continued)

(56) References Cited

U.S. PATENT DOCUMENTS 4,660,360 A * 4/1987 Hardesty ................ A01D 41/14
56/15.8
5,054,277 A 10/1991 Schumacher, II et al.
(Continued)

FOREIGN PATENT DOCUMENTS

DE 102004024232 A1 12/2005

OTHER PUBLICATIONS

International Search Report and Written Opinion for PCT application PCT/US2020/012893, dated Apr. 29, 2020 (17 pages).

Primary Examiner — Adam J Behrens
(74) Attorney, Agent, or Firm — Peter Zacharias; Patrick Sheldrake

(57) ABSTRACT

An agricultural header including a belt that wraps around rollers. A cutter bar assembly that cuts a crop and delivers the crop to the belt. The cutter bar assembly includes a cutter bar, a stationary blade assembly that couples to the cutter bar, a moving blade assembly that couples to the cutter bar. The moving blade assembly moves relative to the stationary blade assembly to cut the crop. A skid couples to the cutter bar and maintains a distance between the ground and the stationary blade assembly and the moving blade assembly. The cutter bar defines a recess that receives debris from the belt and directs the debris to the skid.

20 Claims, 7 Drawing Sheets

(51) Int. Cl.
*A01D 34/40* (2006.01)
*A01D 34/04* (2006.01)
*A01D 57/20* (2006.01)
*A01D 41/14* (2006.01)

(58) Field of Classification Search
CPC ........ A01D 34/30; A01D 34/32; A01D 34/40; A01D 57/20; A01D 61/002; A01D 41/14
See application file for complete search history.

(56) References Cited

U.S. PATENT DOCUMENTS

| | | | |
|---|---|---|---|
| 5,443,421 A | 8/1995 | Heintzman | |
| 7,470,180 B2 | 12/2008 | Honey | |
| 7,908,836 B1 * | 3/2011 | Rayfield | A01D 61/002 56/181 |
| 7,937,920 B2 * | 5/2011 | Schmidt | A01D 41/14 56/181 |
| 8,479,483 B1 * | 7/2013 | Huseman | A01D 41/14 56/181 |
| 2018/0007827 A1 * | 1/2018 | Talbot | A01D 34/18 |
| 2018/0103580 A1 * | 4/2018 | Neely | A01D 34/04 |
| 2018/0139899 A1 | 5/2018 | Shearer | |
| 2018/0184587 A1 * | 7/2018 | Cook | A01D 34/305 |
| 2019/0124843 A1 * | 5/2019 | Augustine | A01D 57/20 |

* cited by examiner

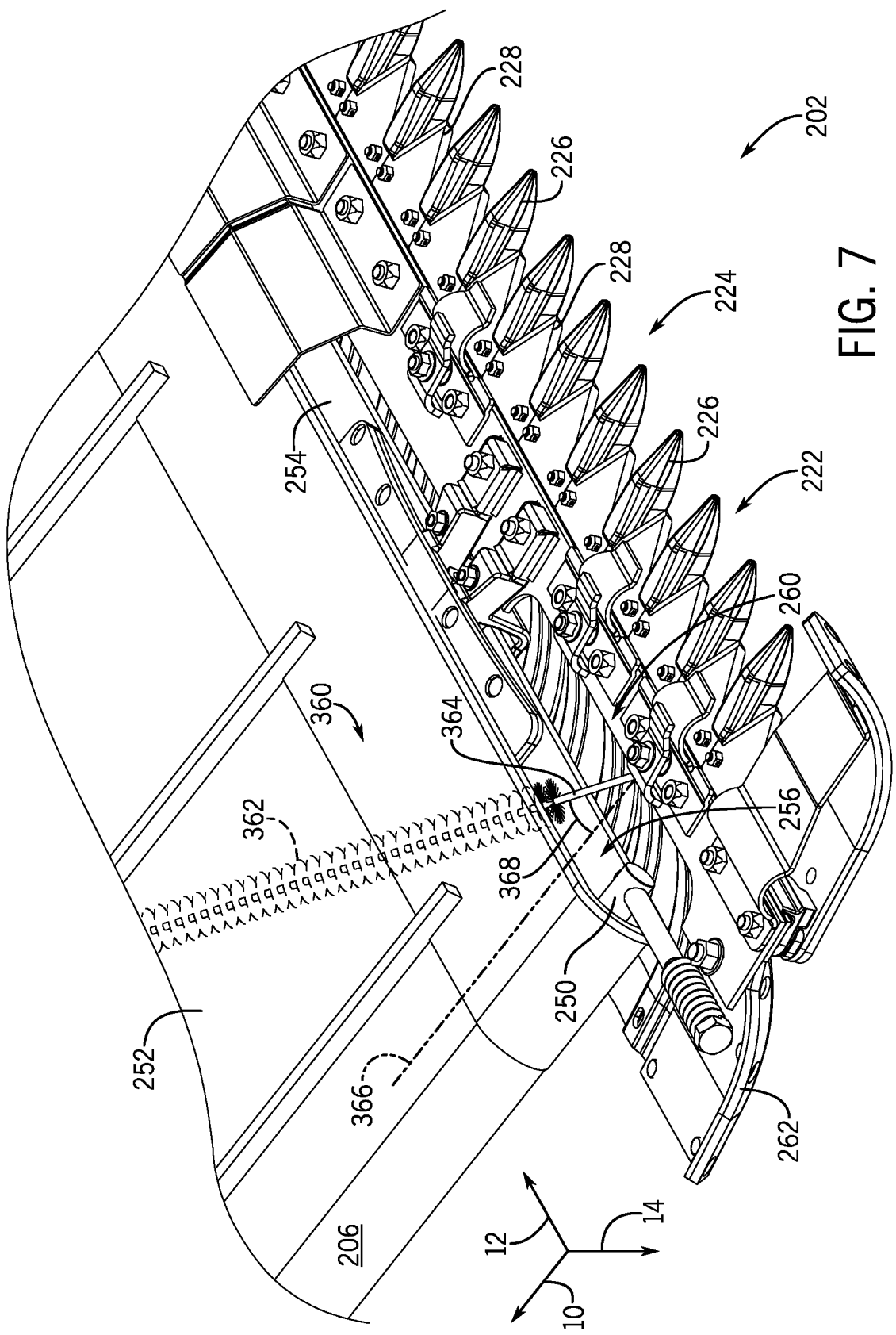

_US 11,399,458 B2_

AGRICULTURAL HEADER WITH DEBRIS REMOVAL SYSTEM

BACKGROUND

The present disclosure relates generally to an agricultural header.

A harvester may be used to harvest agricultural crops, such as barley, beans, beets, carrots, corn, cotton, flax, oats, potatoes, rye, soybeans, wheat, or other plant crops. Furthermore, a combine (e.g., combine harvester) is a type of harvester generally used to harvest certain crops that include grain (e.g., barley, corn, flax, oats, rye, wheat, etc.). During operation of a combine, the harvesting process may begin by removing a plant from a field, such as by using a header. The header may cut the agricultural crops and transport the cut crops using a belt system to a processing system of the combine. Over time debris may accumulate in the belt system, which may wear the belt and hinder operation of the belt system.

BRIEF DESCRIPTION

In one embodiment, an agricultural header including a belt that wraps around rollers. A cutter bar assembly that cuts a crop and delivers the crop to the belt. The cutter bar assembly includes a cutter bar, a stationary blade assembly that couples to the cutter bar, a moving blade assembly that couples to the cutter bar. The moving blade assembly moves relative to the stationary blade assembly to cut the crop. A skid couples to the cutter bar and maintains a distance between the ground and the stationary blade assembly and the moving blade assembly. The cutter bar defines a recess that receives debris from the belt and directs the debris to the skid.

In another embodiment, an agricultural header including a belt that wraps around rollers. A cutter bar assembly that cuts a crop and delivers the crop to the belt. The cutter bar assembly includes a cutter bar, a stationary blade assembly that couples to the cutter bar, a moving blade assembly that couples to the cutter bar. The moving blade assembly moves relative to the stationary blade assembly to cut the crop. A skid couples to the cutter bar and maintains a distance between the ground and the stationary blade assembly and the moving blade assembly. The cutter bar defines an angled surface that receives debris from the belt and directs the debris to the skid.

In another embodiment, an agricultural header including a belt that wraps around rollers. A cutter bar assembly that cuts a crop and delivers the crop to the belt. The cutter bar assembly includes a cutter bar, a stationary blade assembly that couples to the cutter bar, a moving blade assembly that couples to the cutter bar. The moving blade assembly moves relative to the stationary blade assembly to cut the crop. A skid couples to the cutter bar and maintains a distance between the ground and the stationary blade assembly and the moving blade assembly. A debris removal tool that couples to the cutter bar. The debris removal tool removes debris from between opposing strands of the belt and redirects the debris to the skid.

DRAWINGS

These and other features, aspects, and advantages of the present disclosure will become better understood when the following detailed description is read with reference to the accompanying drawings in which like characters represent like parts throughout the drawings, wherein:

FIG. 7 is a partial perspective view of the cutter bar assembly of FIG. 3, according to an embodiment of the disclosure.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Figure 1:
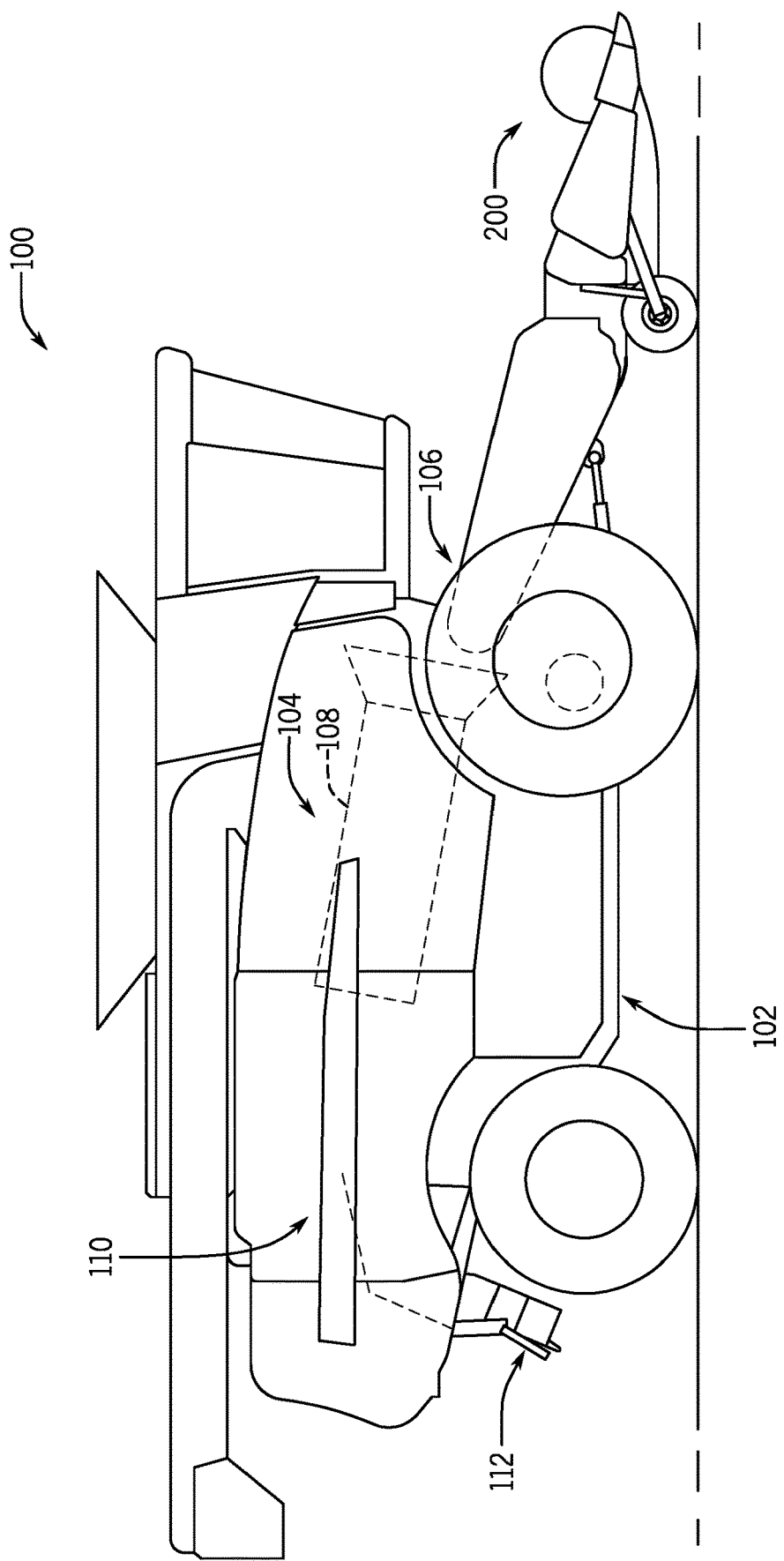
FIG. 1 is a side view of an agricultural harvester having a header, according to an embodiment of the disclosure.

Turning to the drawings, FIG. 1 is a side view of an embodiment of an agricultural harvester 100 having a header 200. The agricultural harvester 100 includes a chassis 102 configured to support the header 200 and an agricultural crop processing system 104. As described above, the header 200 is configured to cut crops and to transport the cut crops toward an inlet 106 of the agricultural crop processing system 104 for further processing of the cut crops. The agricultural crop processing system 104 receives cut crops from the header 200 and separates desired crop material from crop residue. For example, the agricultural crop processing system 104 may include a thresher 108 having a cylindrical threshing rotor that transports the crops in a helical flow path through the harvester 100. In addition to transporting the crops, the thresher 108 may separate certain desired crop material (e.g., grain) from the crop residue, such as husks and pods, and enable the desired crop material to flow into a cleaning system located beneath the thresher 108. The cleaning system may remove debris from the desired crop material and transport the desired crop material to a storage compartment within the harvester 100. The crop residue may be transported from the thresher 108 to a crop residue handling system 110, which may remove the crop residue from the harvester 100 via a crop residue spreading system 112 positioned at the aft end of the harvester 100.

The header 200 includes a cutter bar assembly configured to cut a portion of each crop (e.g., a stalk), thereby separating the cut crop from the soil. The cutter bar assembly is configured to flex along a width of the header 200 to enable the cutter bar assembly to substantially follow the contours of the field. The cutter bar assembly may extend along a substantial portion of the width of the header at a forward end of the header. The cutter bar assembly may include a cutter bar, a stationary blade assembly, and a moving blade assembly. The moving blade assembly may be fixed to the cutter bar, and the cutter bar/moving blade assembly may be driven to oscillate relative to the stationary blade assembly. As the moving blade assembly is driven to oscillate, the blades of the moving blade assembly move relative to the blades of the stationary blade assembly. As the header is moved through the field by the harvester, a portion of a crop (e.g., the stalk) may enter a gap between adjacent blades of the stationary blade assembly and a gap between adjacent blades of the moving blade assembly. Movement of the moving blade assembly causes a blade of the moving blade assembly to move across the gap in the stationary blade assembly, thereby cutting the portion of the crop. However, during operation of the harvester 100, dirt and debris may enter gaps in one or more belts of the header 200 that transport the crop. Dirt and debris in these gaps may be carried into contact with the rollers that drive the belts. Over time the dirt and debris may wear the belts, limiting rotation of the rollers, and/or otherwise affecting operation of the header 200. As will be discussed in detail below, the header 200 may include a debris removal system that facilitates removal of dirt and debris from gaps in the header belts.

The cutter bar assembly is supported by multiple longitudinally extending arms distributed along the width of the header. Each arm is pivotally mounted to a frame of the header, thereby enabling the cutter bar assembly to flex. If a substantially rigid cutter bar is desired (e.g., for certain field conditions, for harvesting certain types of crops, etc.), the pivoting movement of each arm may be blocked, thereby substantially reducing the flexibility of the cutter bar assembly.

Figure 2:
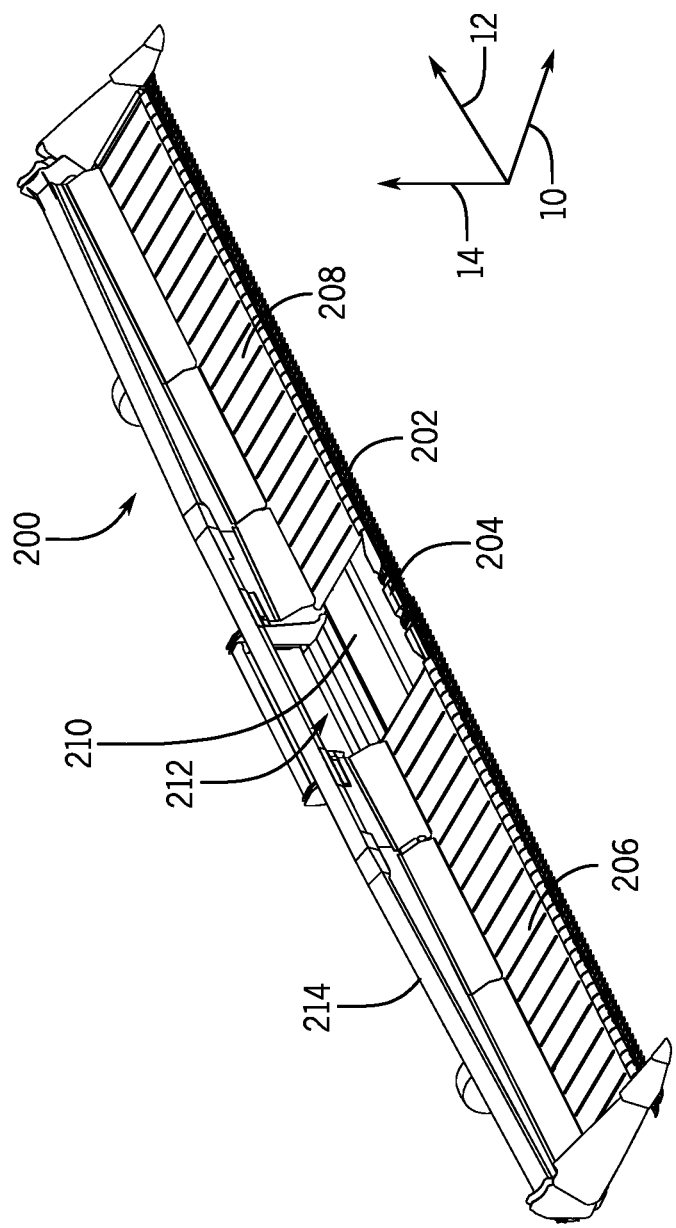
FIG. 2 is a perspective view of an embodiment of a header that may be employed with the agricultural harvester of FIG. 1, according to an embodiment of the disclosure.

FIG. 2 is a perspective view of an embodiment of a header 200 that may be employed within the agricultural harvester 100 of FIG. 1. In the illustrated embodiment, the header 200 includes a cutter bar assembly 202 configured to cut a portion of each crop (e.g., a stalk), thereby separating the crop from the soil. The cutter bar assembly 202 is positioned at a forward end of the header 200 relative to a longitudinal axis 10 of the header 200. As illustrated, the cutter bar assembly 202 extends along a substantial portion of the width of the header 200 (e.g., the extent of the header 200 along a lateral axis 12). The cutter bar assembly 202 includes a cutter bar, a stationary blade assembly, and a moving blade assembly. The moving blade assembly is fixed to the cutter bar (e.g., above the cutter bar relative to a vertical axis 14 of the header 200), and the cutter bar/moving blade assembly is driven to oscillate relative to the stationary blade assembly. In the illustrated embodiment, the moving blade assembly is driven to oscillate by a driving mechanism 204 positioned at the lateral center of the header 200. However, in other embodiments, the moving blade assembly may be driven by another suitable mechanism (e.g., located at any suitable position on the header). As the harvester 100 is driven through a field, the cutter bar assembly 202 engages crops within the field, and the moving blade assembly cuts the crops (e.g., the stalks of the crops) in response to engagement of the cutter bar assembly 202 with the crops.

In the illustrated embodiment, the header 200 includes a first lateral belt 206 on a first lateral side of the header 200 and a second lateral belt 208 on a second lateral side of the header 200, opposite the first lateral side. Each belt is driven to rotate by a suitable drive mechanism, such as an electric motor or a hydraulic motor. The first lateral belt 206 and the second lateral belt 208 are driven such that the top surface of each belt moves laterally inward. In addition, the header 200 includes a longitudinal belt 210 positioned between the first lateral belt 206 and the second lateral belt 208 along the lateral axis 12. The longitudinal belt 210 is driven to rotate by a suitable drive mechanism, such as an electric motor or a hydraulic motor. The longitudinal belt 210 is driven such that the top surface of the longitudinal belt 210 moves rearwardly along the longitudinal axis 10. Agricultural crops that contact the top surface of the lateral belts 206, 208 are driven laterally inwardly to the longitudinal belt 210 due to the movement of the lateral belts 206, 208. In addition, agricultural crops that contact the longitudinal belt 210 and the agricultural crops provided to the longitudinal belt 210 by the lateral belts 206, 208 are driven rearwardly along the longitudinal axis 10 due to the movement of the longitudinal belt 210. Accordingly, the belts move the cut agricultural crops through an opening 212 in the header 200 to the inlet of the agricultural crop processing system 104.

In some embodiments, the cutter bar assembly 202 is flexible along the width of the header 200 (e.g., the extent of the header 200 along the lateral axis 12). For example, the cutter bar assembly 202 may be supported by multiple arms that extend along the longitudinal axis 10 (e.g., along the lateral axis 12 of the header 200). Each arm is mounted to a frame 214 of the header 200 and configured to rotate about a pivot axis relative to the frame. As a result, the cutter bar assembly 202 may flex during operation of the harvester 100. The flexible cutter bar assembly 202 may therefore follow the contours of the field, enabling the cutting height (e.g., the height at which each crop is cut) to be substantially constant along the width of the header 200 (e.g., the extent of the header 200 along the lateral axis 12). However, if a substantially rigid cutter bar assembly 202 is desired (e.g., for certain field conditions, for harvesting certain types of crops, etc.), the pivoting movement of the arms may be blocked, thereby substantially reducing the flexibility of the cutter bar assembly 202.

In certain embodiments, the agricultural header 200 includes multiple locking mechanisms, each configured to transition between a locked state and an unlocked state. While in the locked state, each locking mechanism is configured to block rotation of a respective arm, and while in the unlocked state, each locking mechanism is configured to facilitate rotation of the respective arm relative to the header frame.

Figure 3:
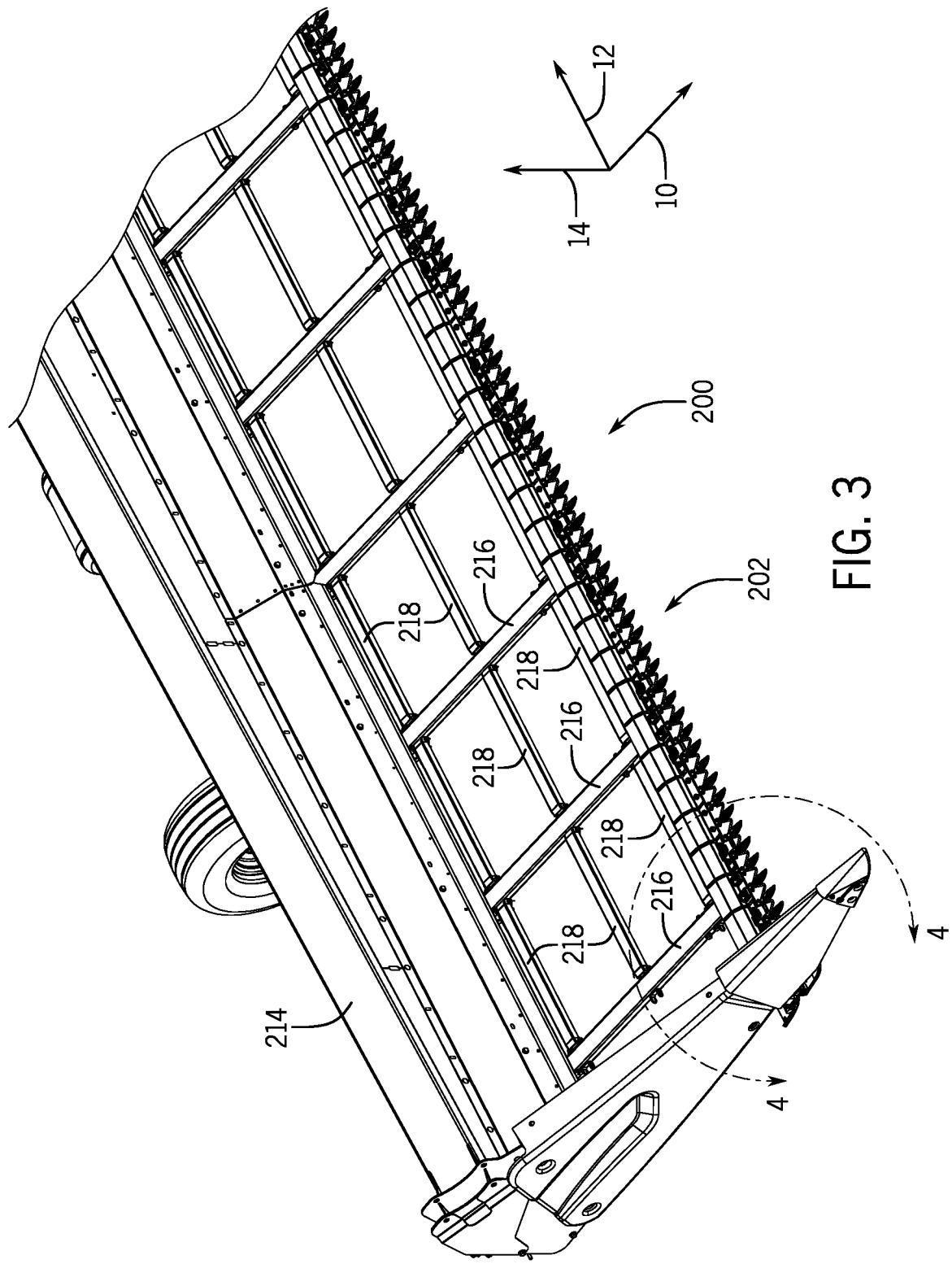
FIG. 3 is a perspective view of a portion of the header of FIG. 2, including a cutter bar assembly and arms that support the cutter bar assembly, according to an embodiment of the disclosure.

FIG. 3 is a perspective view of a portion of the header 200 of FIG. 2 without the belts. As illustrated, the header 200 includes the cutter bar assembly 202 and arms 216 that support the cutter bar assembly 202. As illustrated, each arm 216 extends substantially along the longitudinal axis 10. However, in alternative embodiments, each arm 216 may extend in any suitable direction. In the illustrated embodiment, the arms 216 are distributed along the width of the header 200 (e.g., the extent of the header 200 along the lateral axis 12). The spacing between the arms may be selected to enable the arms to support the cutter bar assembly 202 and to enable the cutter bar assembly 202 to flex during operation of the header 200 (e.g., while the cutter bar assembly 202 is in the flexible configuration). Each arm 216 is pivotally coupled to the frame 214 via a respective pivot joint, and the pivot joint is configured to enable the respective arm 216 to rotate relative to the frame 214 about a respective pivot axis. In the illustrated embodiment, lateral supports 218 extend between respective pairs of arms 216. A first end of each lateral support 218 is pivotally coupled to one arm 216, and a second end of each lateral support 218 is pivotally coupled to another arm 216. The lateral supports 218 are configured to support the respective lateral belts 206, 208, while enabling the arms 216 to rotate about the respective pivot axes relative to the frame 214. While three lateral supports 218 are positioned between each pair of arms 216 in the illustrated embodiment, in other embodiments, more or fewer lateral supports 218 may be positioned between at least one pair of arms 216 (e.g., 1, 2, 3, 4, 5, 6, etc.). Furthermore, in certain embodiments, the lateral supports 218 may be omitted between at least one pair of arms 216.

Figure 4:
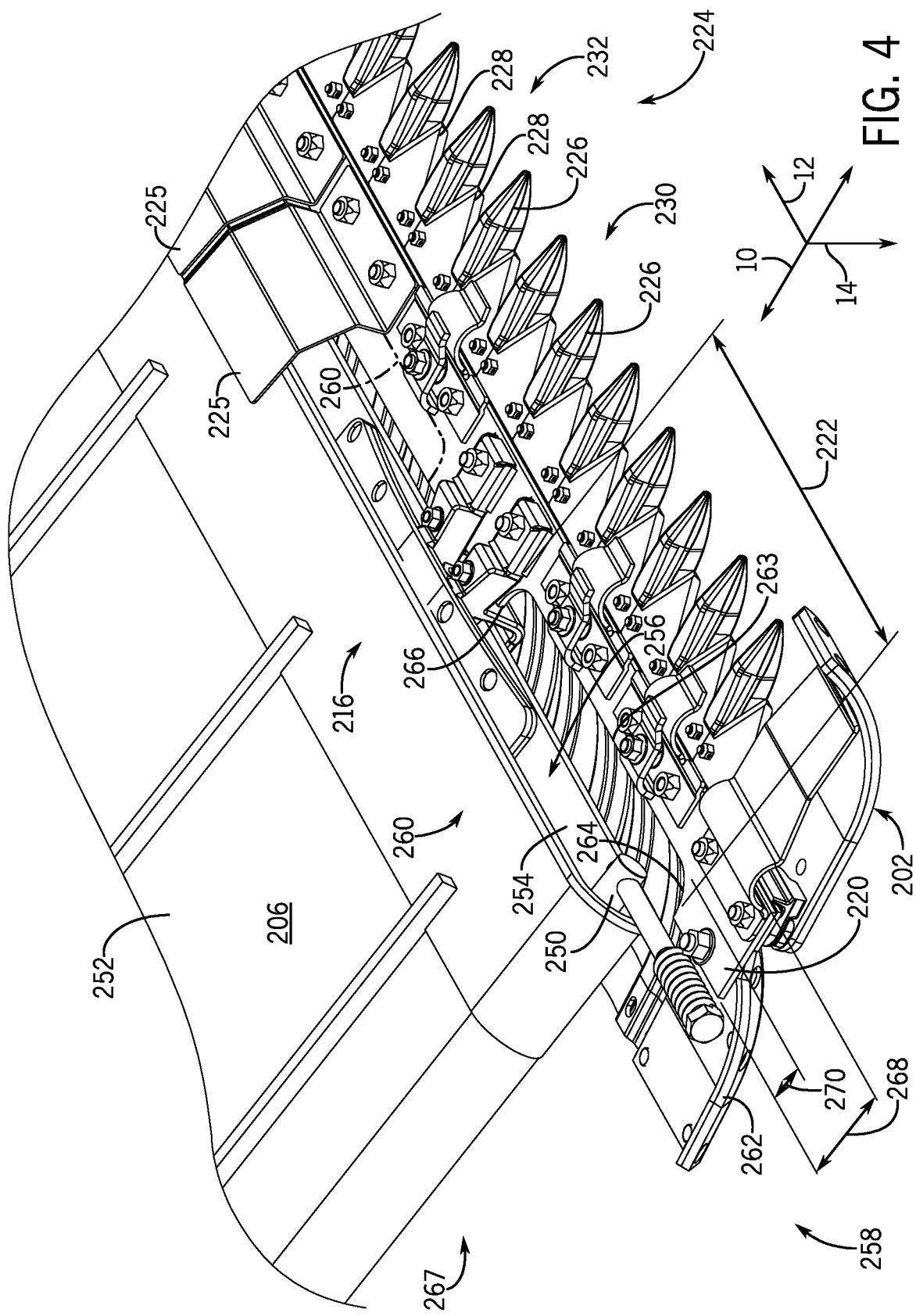
FIG. 4 is a partial perspective view of the cutter bar assembly of FIG. 3 within line 4-4, according to an embodiment of the disclosure.

FIG. 4 is a perspective view of the cutter bar assembly 202 of FIG. 3 within line 4-4. As illustrated, the cutter bar assembly 202 includes a cutter bar 220, a stationary blade assembly 222, a moving blade assembly 224, and ramps 225. The stationary blade assembly 222 includes multiple stationary blades 226 distributed along the width of the stationary blade assembly 222 (e.g., the extent of the stationary blade assembly 222 along the lateral axis 12), and the moving blade assembly 224 includes multiple moving blades 228 distributed along the width of the moving blade assembly 224 (e.g., the extent of the moving blade assembly 224 along the lateral axis 12). As the moving blade assembly 224 is driven to oscillate, the moving blades 228 move relative to the stationary blades 226. As the header 200 is moved through the field by the harvester 100, a portion of a crop (e.g., the stalk) may enter a gap 230 between adjacent stationary blades 226 and a gap 232 between adjacent moving blades 228. Movement of the moving blade assembly 224 causes a moving blade 228 to move across the gap 230 in the stationary blade assembly 222, thereby cutting the portion of the crop. As the moving blade assembly 224 cuts the crop, the crop flows over the ramps 225 and onto the lateral belts (e.g., 206, 208). In operation, a series of rollers 250 (e.g., driven rollers, idle rollers) enable the lateral belts 206 and 208 to continuously rotate and carry crop along the axis 12 to the longitudinal belt 210 described above. The longitudinal belt 210 then carries the crop into the harvester were the crop is further processed.

The ramps 225 may couple to the cutter bar 220 and extend over a leading edge of the lateral belts 206, 208. By extending over the lateral belts 206, 208, the ramps 225 reduce debris (e.g., dirt, crop particulate) from entering a gap 256 between the upper belt strand 252 and lower belt strand 254 of the lateral belts 206, 208. However, during operation of the harvester 100, dirt and debris may enter this gap 256. Dirt and debris in this gap 256 is carried into contact with the rollers (e.g., roller 250) and over time may wear the belt 206, limit rotation of the roller 250, and/or otherwise affect operation of the header 200. For example, more strain may be placed on a motor to turn the belt 206. To facilitate removal of the dirt and debris from this gap 256, the header 200 may include a debris removal system 258 (e.g., self-cleaning system) that enables removal of the dirt and debris from the gap 256. In some embodiments, the debris removal system 258 may include a recess 260 in the cutter bar 220. The recess 260 enables dirt and debris to exit the gap 256 along axis 10. As the debris moves along the axis 10 it exits the gap 256 where it falls through the recess 260 in the cutter bar 220. The debris may then contact skids 262 (e.g., skid plates, skid bars) that ride over the surface of the ground. The skids 262 then direct the debris downward along axis 14 after which the debris slides off of the skids 262 and onto the soil surface. In this way, the recess 260 may provide an outlet for the continuous removal of debris from within the gap 256 formed by the upper and lower belt strands 252, 254 of the belt 206.

The surface 263 of the cutter bar 220 may be curvilinear in order to define a curvilinear recess 260 (e.g., concave shape). In other embodiments, the recess 260 may be square, rectangular, or irregular in shape. In some embodiments, a first end 264 of the recess 260 may extend beyond an end 267 of the belt 206 (e.g., beyond the roller 250 and the outer portion of the belt 206 wrapped around the roller 250) to facilitate removal of the debris from the gap 256. A second end 266 of the recess 260 may extend to the arm 216 that couples the cutter bar assembly 202 to the frame 214.

As illustrated, the cutter bar 220 defines a width 268 and the recess 260 defines a width 270. In some embodiments, the width 270 of the recess 260 may be less than half of the width 268 of the cutter bar 220, in order to facilitate coupling of the stationary blade assembly 222 and the moving blade assembly 224 to the cutter bar 220. In some embodiment, the width 270 of the recess 260 may greater than half the width 268 of the cutter bar 220 between the first and second ends 264, 266 of the recess 260. In still other embodiments, the width 270 of the recess 260 may change between the first and second ends 264, 266. For example, a portion(s) of the recess 260 may define a width greater than half the width 268 of the cutter bar 220, while other portion(s) of the recess 260 may be less than half of the width 268 of the cutter bar 220. In these embodiments, the changes in width 270 may enable a larger recess 260 in the cutter bar 220 that still accommodates the attachment of equipment to the cutter bar 220 (e.g., stationary blade assembly 222, moving blade assembly 224).

While only one recess 260 is illustrated, it should be understood that the cutter bar 220 may define additional recesses 260 along the length of the cutter bar 220. For example, each end of the cutter bar 220 may define a recess 260 to facilitate removal of debris from both of the lateral belts 206 and 208. Moreover, in some embodiments the cutter bar 220 may define a recess(es) 260 between each of the arms 216.

Figure 5:
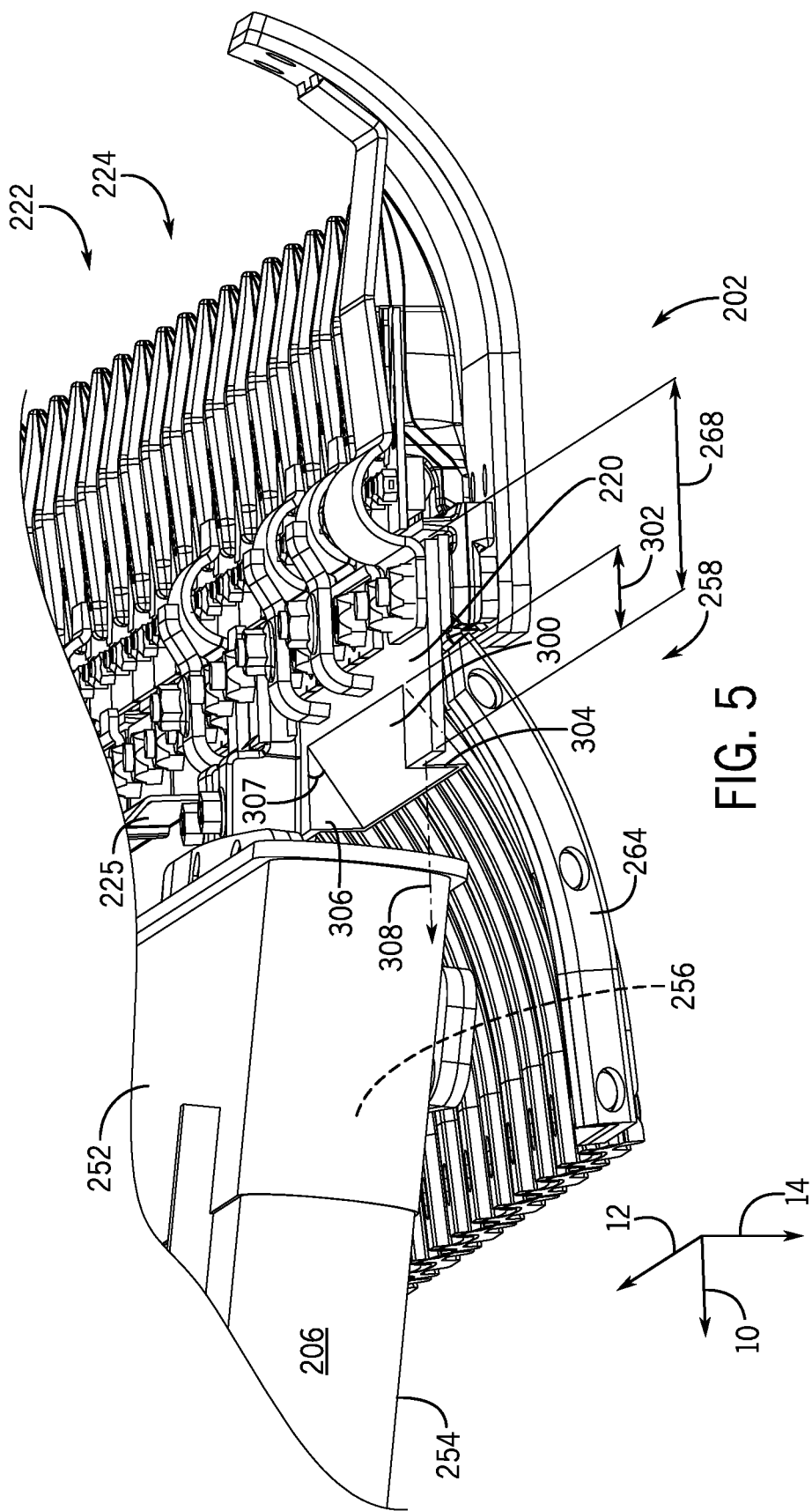
FIG. 5 is a partial perspective view of the cutter bar assembly of FIG. 3, according to an embodiment of the disclosure.

FIG. 5 is a perspective view of the cutter bar assembly 202 of FIG. 3. In some embodiments, the cutter bar 220 of the cutter bar assembly 202 may define one or more angled surfaces 300 (e.g., ramps) along the cutter bar 220. The angled surfaces 300 may similarly facilitate debris removal from the header 200. As debris exits the gap 256 between the upper and lower belt strands 252, 254, it may contact the cutter bar 220. The angled surface 300 then redirects the debris (e.g., enables the debris to slide) downward in direction 14 toward the skid(s) 262. After contacting the skid 262, the skid 262 guides the debris downward and rearward along axis 14 and 10 before depositing the debris on the soil surface.

As illustrated, the cutter bar 220 defines a width 268 and the angled surface 300 defines a width 302. In some embodiments, the width 302 of the angled surface 300 may be less than half of the width 268 of the cutter bar 220, in order to facilitate coupling of the stationary blade assembly 222 and the moving blade assembly 224 to the cutter bar 220. In some embodiment, the width 302 of the angled surface 300 may greater than half the width 268 of the cutter bar 220 between first and second ends 304, 306 of the angled surface 300. In still other embodiments, the width 302 of the angled surface 300 may change between the first and second ends 304, 306. For example, a portion(s) of the angled surface 300 may define a width greater than half the width 268 of the cutter bar 220, while other portion(s) of the angled surface 300 are less than half of the width 268 of the cutter bar 220. In these embodiments, the changes in width 302 may increase the overall area of the angled surface 300 while still accommodating the attachment of equipment to the cutter bar 220 (e.g., stationary blade assembly 222, moving blade assembly 224).

While only one angled surface 300 is illustrated, it should be understood that the cutter bar 220 may define additional angled surfaces 300 along the length of the cutter bar 220. For example, each end of the cutter bar 220 may define an angled surface 300 to facilitate removal of debris from both of the lateral belts 206 and 208. Moreover, in some embodiments the cutter bar 220 may define an angled surface(s) 300 between each connection point of the arms 216 and the cutter bar 220.

The angle of the angled surface 300 may vary depending on the embodiment. For example, the angle 307 may vary between 5-85 degrees relative to the lateral axis 308 of the cutter bar 220. In some embodiments, the angle 307 may change between first and second ends 304, 306 of the angled surface 300. The angled surface 300 may therefore direct debris both downwards along axis 14 as well as along the axis 12. For example, the angle 307 may increase from the first end 304 toward the second end 306 of the angled surface 300. In this way, the angled surface 300 may direction debris away from the roller 250 while simultaneously directing the debris to the skid(s) 262. In still other embodiments, the angled surface 300 may couple to the cutter bar 220 at a single point. In other words, the angled surface 300 may not couple to the cutter bar 220 at the ends 304 and 306.

Figure 6:
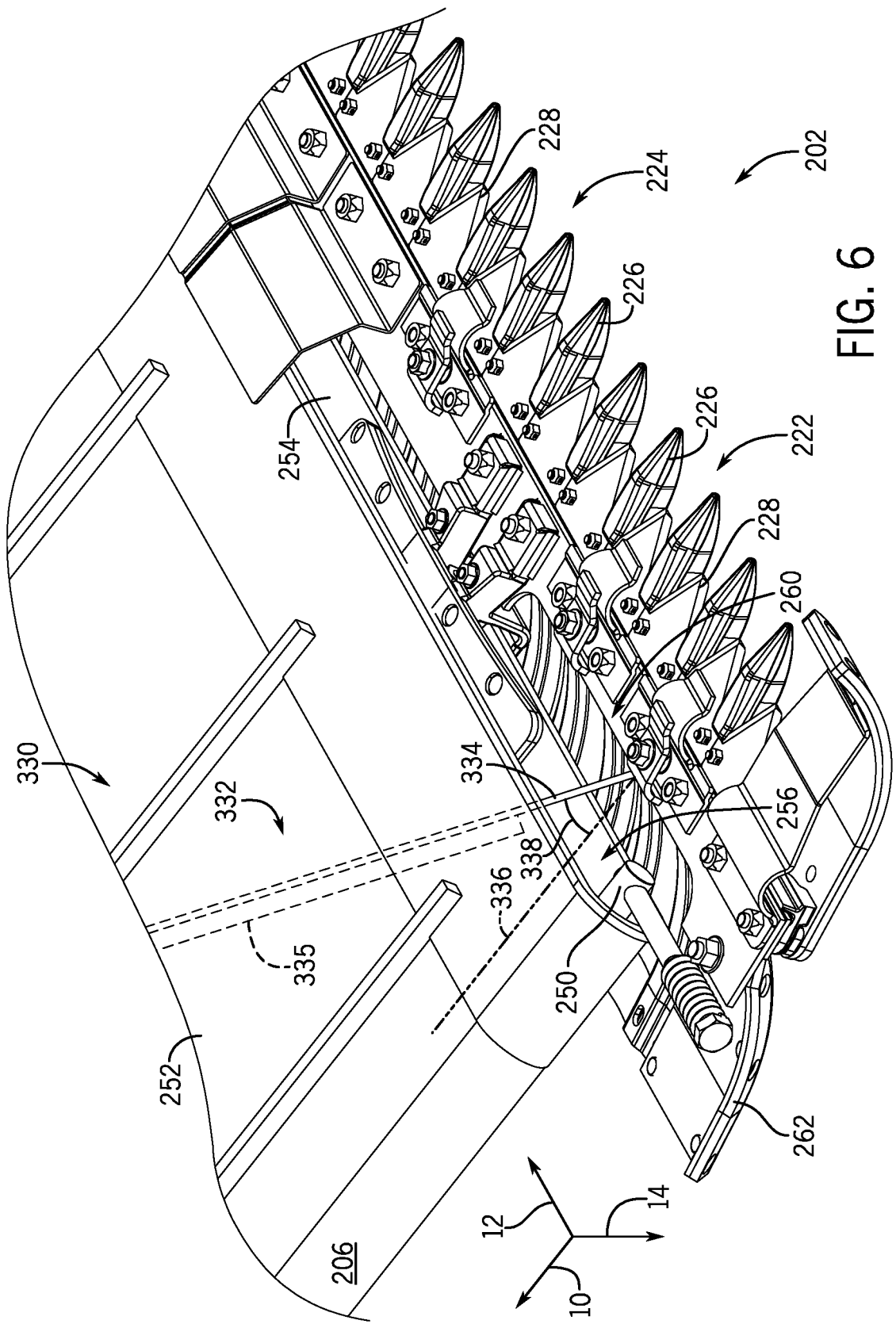
FIG. 6 is a partial perspective view of the cutter bar assembly of FIG. 3, according to an embodiment of the disclosure.

FIG. 6 is a perspective view of the cutter bar assembly 202 of FIG. 3. As explained above, the cutter bar 220 may include recesses 260 and/or angled surfaces 300 that enable debris to exit the gap 256 between the upper and lower belt strands 252, 254 where it is redirected to the ground. In some embodiments, the debris removal system 258 may include a debris removal tool 330. In some embodiments, the debris removal tool 330 may be a scraper 332 with a shaft 334 that extends into the gap 256 between the belt strands 252 and 254. In some embodiments, a piece of rigid or semi-rigid material 335 (e.g., rubber or plastic) may couple to the shaft 334 to facilitate scraping of debris off of the belts 206, 208. In operation, the scraper 332 contacts debris in the gap 256 and redirects/guides the debris out of the gap 256 and towards the recess 260 and/or an angled surface 300 in the cutter bar 220. The debris then falls through the recess 260 and/or is guided towards the skid(s) 262 and then to the ground. For example, the shaft 334 of the scraper 332 may be angled with respect to a longitudinal axis 336 of the belt 206. The angle 338 formed by the shaft 334 and the axis 336 may be 5-85 degrees to enable debris that contacts the scraper 332 to be guided along the debris removal tool 330 and to the recess 260 and/or angled surface 300 of the cutter bar 220 for removal from the header 200.

FIG. 7 is a perspective view of the cutter bar assembly 202 of FIG. 3. As explained above, the cutter bar 220 may include recesses 260 and/or angled surfaces 300 that enable debris to exit the gap 256 between the upper and lower belt strands 252, 254 where it is redirected to the ground. In some embodiments, the debris removal system 258 may include a debris removal tool 360. In some embodiments, the debris removal tool 360 may be a brush 362 with a shaft 364 that extends into the gap 256 between the belt strands 252 and 254. In operation, bristles on the brush 362 contacts debris in the gap 256 and on the belt 206 and redirects/guides the debris out of the gap 256 and towards the recess 260 and/or an angled surface 300 in the cutter bar 220. The debris then falls through the recess 260 and/or is guided towards the skid(s) 262 and then on to the ground. For example, the shaft 364 of the brush 362 may be angled with respect to a longitudinal axis 366 of the belt 206. The angle 368 formed by the shaft 364 and the axis 366 may be 5-85 degrees to enable debris that contacts the brush 362 to be guided along the brush 362 and to the recess 260 and/or angled surface 300 of the cutter bar 220 for removal from the header 200.

While only certain features have been illustrated and described herein, many modifications and changes will occur to those skilled in the art. It is, therefore, to be understood that the appended claims are intended to cover all such modifications and changes as fall within the true spirit of the disclosure.

The invention claimed is:

1. An agricultural header, comprising:
a belt configured to wrap around rollers;
a cutter bar assembly configured to cut a crop and deliver the crop to the belt, the cutter bar assembly comprising:
a cutter bar comprising a flat plate;
a stationary blade assembly coupled to the cutter bar;
a moving blade assembly coupled to the cutter bar, wherein the moving blade assembly is configured to move relative to the stationary blade assembly to cut the crop; and
a skid coupled to the cutter bar, wherein the skid is positioned below the cutter bar, and the skid is configured to maintain a distance between a ground and the stationary blade assembly and the moving blade assembly; and
wherein a recess is formed within the flat plate of the cutter bar, the recess defines an opening in the flat plate, and the recess is configured to receive debris from the belt and to direct the debris to the skid.

2. The agricultural header of claim 1, wherein a first end of the recess extends beyond an end of the belt.

3. The agricultural header of claim 1, wherein a width of the recess is less than one-half of a width of the cutter bar.

4. The agricultural header of claim 1, wherein a width of the recess is less than a length of the recess.

5. The agricultural header of claim 1, wherein a second recess is formed within the flat plate of the cutter bar, the second recess defines a second opening in the flat plate, and the second recess is configured to receive the debris from the belt and to direct the debris to the skid.

6. The agricultural header of claim 1, wherein the recess extends between arms that are configured to couple the cutter bar assembly to a frame.

7. The agricultural header of claim 1, wherein the cutter bar assembly comprises a ramp, wherein the ramp couples to the cutter bar and is configured to direct the crop from the cutter bar assembly to the belt.

8. An agricultural header, comprising:
a belt configured to wrap around rollers;
a cutter bar assembly configured to cut a crop and deliver the crop to the belt, the cutter bar assembly comprising:
a cutter bar comprising a flat plate;

a stationary blade assembly coupled to the cutter bar;
a moving blade assembly coupled to the cutter bar, wherein the moving blade assembly is configured to move relative to the stationary blade assembly to cut the crop; and
a skid coupled to the cutter bar, wherein the skid is positioned below the cutter bar, and the skid is configured to maintain a distance between a ground and the stationary blade assembly and the moving blade assembly; and
wherein a recess is formed within the flat plate of the cutter bar, the recess defines an opening in the flat plate, the cutter bar comprises an angled surface extending downwardly and rearwardly from the recess, and the angled surface is configured to receive debris from the belt via the recess and to direct the debris to the skid.

9. The agricultural header of claim 8, wherein a first end of the angled surface extends beyond an end of the belt.

10. The agricultural header of claim 8, wherein a width of the angled surface is less than a length of the angled surface.

11. The agricultural header of claim 8, wherein a second recess is formed within the flat plate of the cutter bar, the second recess defines a second opening in the flat plate, the cutter bar comprises a second angled surface extending downwardly and rearwardly from the second recess, and the second angled surface is configured to receive the debris from the belt via the second recess and to direct the debris to the skid.

12. The agricultural header of claim 8, wherein the recess and the angled surface extend between arms that are configured to couple the cutter bar assembly to a frame.

13. The agricultural header of claim 8, wherein the cutter bar assembly comprises a ramp, wherein the ramp couples to the cutter bar and is configured to direct the crop from the cutter bar assembly to the belt.

14. An agricultural header, comprising:
a belt configured to wrap around rollers;
a cutter bar assembly configured to cut a crop and deliver the crop to the belt, the cutter bar assembly comprising:
a cutter bar comprising a flat plate;
a stationary blade assembly coupled to the cutter bar;
a moving blade assembly coupled to the cutter bar, wherein the moving blade assembly is configured to move relative to the stationary blade assembly to cut the crop;
a skid coupled to the cutter bar, wherein the skid is positioned below the cutter bar, and the skid is configured to maintain a distance between a ground and the stationary blade assembly and the moving blade assembly; and
a debris removal tool coupled to the cutter bar, wherein the debris removal tool is configured to remove debris from between opposing strands of the belt and to redirect the debris to the skid; and
wherein a recess is formed within the flat plate of the cutter bar, the recess defines an opening in the flat plate, and the recess is configured to receive the debris from the belt and to direct the debris to the skid.

15. The agricultural header of claim 14, wherein the debris removal tool comprises a brush.

16. The agricultural header of claim 14, wherein the debris removal tool comprises a scraper.

17. The agricultural header of claim 14, wherein a first end of the recess extends beyond an end of the belt.

18. The agricultural header of claim 14, wherein a width of the recess is less than one-half of a width of the cutter bar.

19. The agricultural header of claim 14, wherein a width of the recess is less than a length of the recess.

20. The agricultural header of claim 14, wherein the debris removal tool is configured to redirect the debris to the skid via the recess.

* * * * *